US007287081B1

(12) United States Patent
Deboer et al.

(10) Patent No.: US 7,287,081 B1
(45) Date of Patent: Oct. 23, 2007

(54) CONTROLLED CALLS IN A TRANSMISSION NETWORK

(75) Inventors: Evert Deboer, Nepean (CA);
Jean-Pierre Coupal, Gatineau (CA);
Richard Trudel, Ile Bizard (CA);
Stephanie Gagnon, Montreal (CA)

(73) Assignee: Nortel Networks Limited (CA)

( * ) Notice: Subject to any disclaimer, the term of this patent is extended or adjusted under 35 U.S.C. 154(b) by 673 days.

(21) Appl. No.: 10/738,896

(22) Filed: Dec. 17, 2003

(51) Int. Cl.
*G06F 15/16* (2006.01)
(52) U.S. Cl. .................. 709/227; 709/224; 709/235; 709/238; 370/217; 370/225; 370/226; 370/227; 370/228; 370/395.2
(58) Field of Classification Search ............. 709/277, 709/235, 238, 224, 227, 228; 455/133, 154.1, 455/179.1, 277.1, 464; 370/217, 225, 226, 370/227, 228, 395.2
See application file for complete search history.

(56) References Cited

U.S. PATENT DOCUMENTS

| 4,975,914 | A | * | 12/1990 | Ashton et al. .................. 714/4 |
| 5,195,086 | A | * | 3/1993 | Baumgartner et al. ...... 370/264 |
| 5,216,517 | A | * | 6/1993 | Kinoshita et al. ........... 358/400 |
| 5,663,947 | A | * | 9/1997 | Wille-Fier et al. .......... 370/360 |
| 5,828,835 | A | * | 10/1998 | Isfeld et al. ................. 709/200 |
| 5,930,479 | A | * | 7/1999 | Hall ........................... 709/238 |
| 5,991,264 | A | * | 11/1999 | Croslin ........................ 370/225 |
| 6,041,353 | A | * | 3/2000 | Hirata et al. ................. 709/224 |
| 6,091,731 | A | * | 7/2000 | Biegaj et al. ............ 370/235.1 |
| 6,134,671 | A | * | 10/2000 | Commerford et al. .......... 714/4 |
| 6,243,753 | B1 | * | 6/2001 | Machin et al. ............... 709/227 |
| 6,275,856 | B1 | * | 8/2001 | Hirata et al. ................. 709/224 |
| 6,275,889 | B1 | * | 8/2001 | Saito ........................... 710/313 |
| 6,848,001 | B1 | * | 1/2005 | Sakamoto et al. ........... 709/227 |
| 6,912,221 | B1 | * | 6/2005 | Zadikian et al. ........ 370/395.21 |
| 7,099,327 | B1 | * | 8/2006 | Nagarajan et al. ........... 370/394 |
| 2002/0168054 | A1 | * | 11/2002 | Klos et al. ................... 379/1.04 |
| 2002/0174232 | A1 | * | 11/2002 | Kikuta et al. ................ 709/227 |
| 2002/0191247 | A1 | * | 12/2002 | Lu et al. ...................... 359/124 |
| 2003/0012183 | A1 | * | 1/2003 | Butler et al. ................. 370/352 |
| 2003/0026297 | A1 | * | 2/2003 | Nagarajan et al. ........... 370/535 |
| 2003/0043821 | A1 | * | 3/2003 | Van Den Bosch et al. . 370/400 |
| 2003/0061336 | A1 | * | 3/2003 | Van Den Bosch et al. . 709/223 |
| 2003/0126246 | A1 | * | 7/2003 | Blouin et al. ................ 709/223 |
| 2003/0177213 | A1 | * | 9/2003 | Wallace et al. .............. 709/223 |
| 2003/0212782 | A1 | * | 11/2003 | Canali et al. ................ 709/223 |
| 2003/0212829 | A1 | * | 11/2003 | Schofield et al. ........... 709/250 |
| 2003/0235153 | A1 | * | 12/2003 | Lee et al. .................... 370/229 |
| 2004/0003091 | A1 | * | 1/2004 | Coulthard et al. ........... 709/227 |
| 2004/0022198 | A1 | * | 2/2004 | Weil et al. ................... 370/252 |
| 2004/0203637 | A1 | * | 10/2004 | Dodla ...................... 455/414.1 |
| 2005/0105470 | A1 | * | 5/2005 | Lazzeri et al. .............. 370/237 |
| 2005/0270979 | A1 | * | 12/2005 | Pauluhn et al. ............. 370/238 |

\* cited by examiner

*Primary Examiner*—Michael Won
(74) *Attorney, Agent, or Firm*—McGuinness + Manaras LLP

(57) ABSTRACT

Commands are shown and described that enable a user to manipulate a call connection for the purpose of maintaining links in a network. The Block command prevents new traffic from being added to an output port of a device in a connection. The Forced Restoration/Release of Forced Restoration command set may be used to service the working channel. The Lockout of Restoration/Release of Lockout commands provide an alternative method of servicing a working connection and preventing unnecessary generation of redundant connections in the network.

8 Claims, 8 Drawing Sheets

CONTROLLED CALLS IN A TRANSMISSION NETWORK

FIELD OF THE INVENTION

This invention relates generally to the field of network and more particularly to the field of network maintenance.

BACKGROUND OF THE INVENTION

An Automatically Switched Transport Network (ASTN) architecture defines a network including a set of control functions used to establish and release connections across a transport network. In general, the ASTN architecture includes three planes; a control plane, a management plane and a transport plane. The control plane supports both switched and soft permanent connections by efficient configuration of connections within the transport plane. The management plane provides the Operational, Administration and Management (OAM) functions for the control and transport plane. The transport plane provides bidirectional or unidirectional transfer of user information, from one location to another. It can also provide transfer of some control and network management information.

In the ASTN architecture, communication between two end points is performed using calls. A call contains call data and connection data including an end-to-end path. A call can have more than one connection between the head and tail end nodes of the call. A connection is a path between the head and tail end nodes of the call. The connection consists of several sub-network connections, where a sub-network connection could be, for example, a switch matrix connection in one network element in the path. Thus the connection is a concatenation of link connections and sub-network connections that allow the transport of user information between head and tail end nodes of a call. Calls between endpoints may be initiated either automatically (by a router) or alternatively manually by a network operator through user entry at an Operation Administration and Maintenance (OAM) station.

The control plane provides a network operator with the ability to offer a user calls with a selectable class of service (CoS) (e.g., availability, duration of interruptions, Errored Seconds, etc). Protection and restoration are 'survivability mechanisms' that are used by management plane to support the CoS requested by the user. Protection schemes protect a communication link by pre-calculating an alternate 'protection' path. In the event of a failure of the communication link, traffic is immediately switched from the working path to the protection path. In most cases protection paths are defined in layer one of the network architecture.

In contrast, the restoration mechanism identifies an alternate, restoration path between a head and tail node only after a failure occurs on the communication link. Restoration is typically performed at the network control layer. Both protection and restoration mechanisms have their advantages and disadvantages. One advantage of the protection mechanism is that the protection channel is immediately available in the event of need, and thus there is virtually no impact in traffic delivery when switching from the working to the protection channel. However, a drawback of the protection mechanism is that it requires installation of a protection channel for each APS defined working channel. In networks having large numbers of connections, storing a protection channel for each working channel may not be feasible. Restoration is a solution that overcomes these problems, because restoration paths are only generated when needed, and deleted thereafter. However, the transfer of a call resulting from a failure or maintenance of a link in the connection associated with the call is delayed by the need to compute and signal a new path for a connection.

SUMMARY OF THE INVENTION

According to one aspect of the invention, a method for maintaining a network comprising the steps of issuing a command at a user interface coupled to the network, the command including an identifier, the command for controlling selection of a communication path associated with the identifier.

According to another aspect of the invention, a method for maintaining a network includes the steps of, responsive to an input command from a user at a user interface, the command indicating a call between two devices that is routed over a connection between the two devices, determining an alternate connection for the call, and then transferring traffic associated with the call over the connection to the alternate connection.

According to another aspect of the invention, a method of operating a computer system in a network is provided, wherein the computer system having program code stored thereon in a storage device. The program code includes a set of instructions operable to cause the computer system to perform at least one task, wherein the set of instructions includes a Block instruction including an identifier of a facility in the network, the block instruction for causing the computer system to inhibit new connections that use the facility from being generated.

According to another aspect of the invention, a method of operating a computer system in a network is provided, wherein the computer system having program code stored thereon in a storage device. The program code includes a set of instructions operable to cause the computer system to perform at least one task, wherein the set of instructions includes a Forced Restoration instruction including an identifier of a call having a working connection between two devices in the network, the Forced Restoration instruction for causing the computer system to identify a restoration connection between the two devices, and for forwarding traffic associated with the call between the two devices over the protection connection to permit maintenance of the working connection.

According to another aspect of the invention, a method of operating a computer system in a network is provided, wherein the computer system having program code stored thereon in a storage device. The program code includes a set of instructions operable to cause the computer system to perform at least one task, wherein the set of instructions includes a Lock out of Restoration instruction including an identifier of a call over a working connection between two devices in the network, the Lock out of Restoration instruction for inhibiting the transfer of traffic associated with the call from the working connection to another connection.

DESCRIPTION

Figure 1:
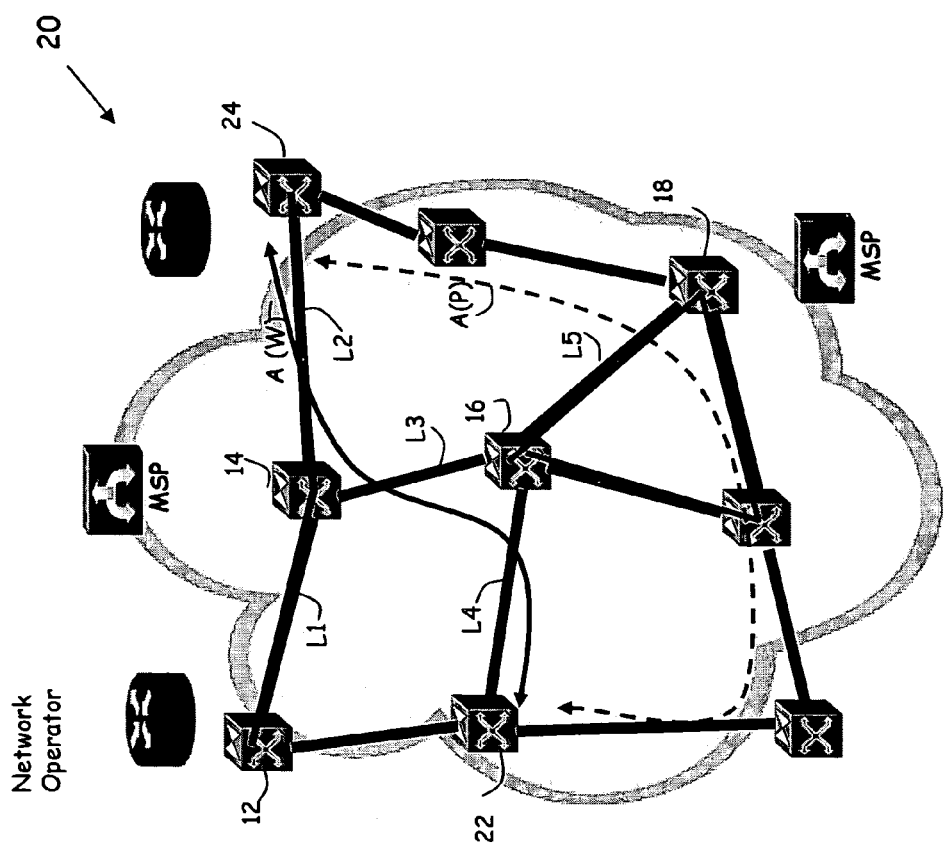
FIG. 1 illustrates a mesh networked system.

Referring now to FIG. 1, a diagram illustrating a mesh architecture 20 on which ASTN protocols may be executed is shown to include a number of devices 12, 14, 16, etc., coupled together via links, such as links L1, L2, etc. The links may be formed from any transport medium. A call between two end points, such as end point 22 and end point 24 causes a connection to be formed between the endpoints, the connection being composed of a number of links. The connection provides a working channel for communication between end points 22 and 24.

The calls have associated Classes of Service (CoS) which define certain characteristics for handling the packet including a protection behavior for the connection. The protection behavior describes how the connection should be handled in the event of a failure of any of the links that form the connection. Two types of protection include Automatic Protection Switching (APS) and Restoration. For connections that use APS, protection paths are defined in the transmission network. The protection paths may be in the form of a ring, linear, mesh and other arrangements known to those of skill in the art. As calls are initiated between endpoints, working paths are allocated to the call. In some embodiments, Extra Traffic for the call is forwarded on the preconfigured protection channels, thereby increasing the bandwidth for communication between the endpoints. When one or more links in a working path fail, the traffic from the call path can be transferred to the protection path. For example, in FIG. 1, a working channel is formed between devices 22 and 24 as indicated by the line A(W) to include Links L2, L3 and L4. At relatively the same time, a protection channel is formed between devices 22 and 24 as shown by dashed line A(P) including links. Restoration is similar to protection, except that the protection channel is not identified until after the connection has failed. APS and Restoration can be used on any networks, including both ring and dynamic mesh.

Figure 2:
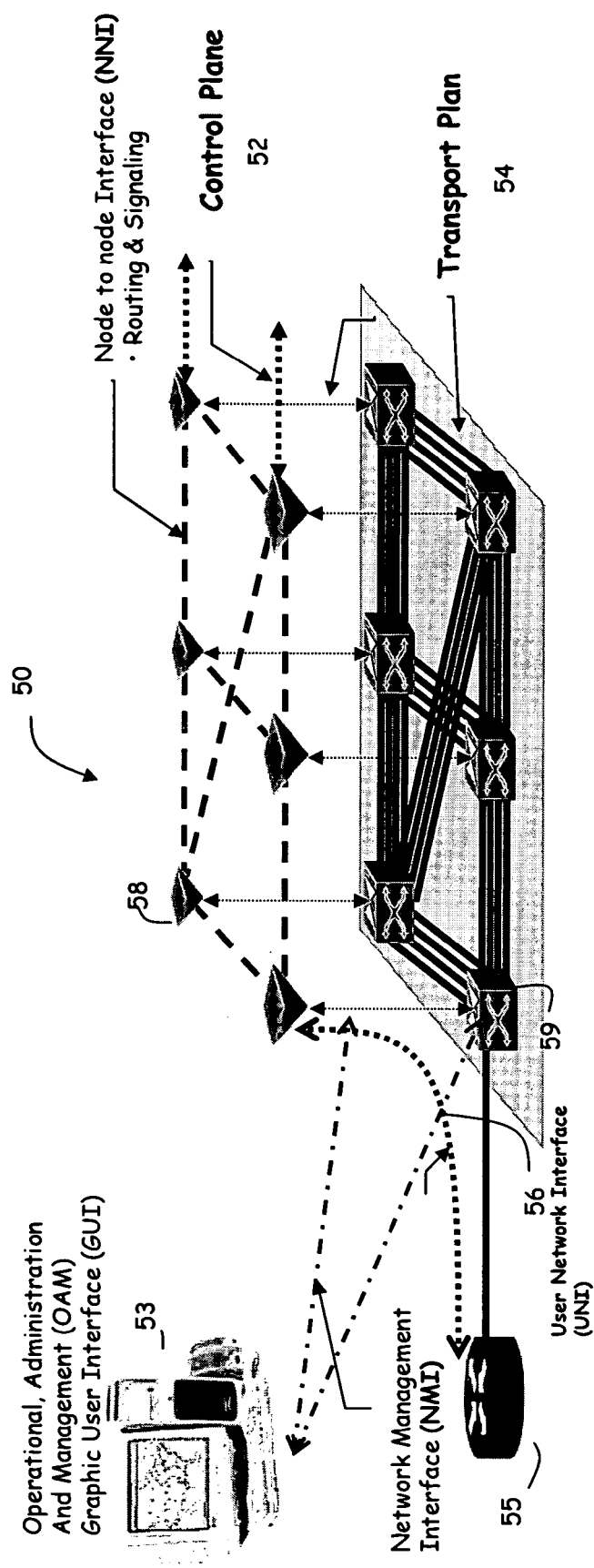
FIG. 2 illustrates the architecture of an ASTN mesh network in which the present invention may be implemented.

Referring now to FIG. 2, a meshed ASTN in which the present invention may be employed is shown in more detail to include a control plane 52, a transport plane 54 and a management plane 56. In the network embodiment of FIG. 1, call and connection control is distributed throughout the mesh network through the use of separate Connection Controllers (CCs) 58 in the control plane. The CCs 58 are distributed through the network, and may be connected to one or more physical devices 59 in the transport plane 54, which may be, for example, switches or routers.

The management plane performs management functions for the transport plane, the control plane and the system as a whole. A User Network Interface (UNI 56) is coupled to the control and transport planes. According to one aspect of the invention, the OAM forwards commands to the control plane 52, to permit a user to manipulate call connections for the purposes of performing maintenance on the link. Permitting a user to control and manipulate call connections allows the user prepare the system for impending link maintenance outages by either re-routing calls before the link or device is removed, preventing new calls from being assigned to the connection, or otherwise forcing certain connections in a particular path. Then the link or device may be removed and repaired without affecting network traffic.

There are potentially numerous instructions that may be used to control call connections, and three such instructions will now be described. It should be understood that the present invention is not limited to the below instructions, but rather to any method that permits a user or program to control and manipulate call connections to prepare for impending link maintenance outages via control plane commands. The instructions may be input manually, via a user interface (such as a command line interface or GUI), or alternatively may be software controlled instructions executing at the OAM in response to system conditions. Although the below description refers to instructions that are input to a graphical user interface any alternative method for a user or program to provide an indication to a computer system to achieve the desired effect could alternatively be used. In addition, although the description refers generally to the instructions being provided by a user at the OAM, it is understood that the commands may be provided at any control interface within the system, and thus the present invention is not limited to input being provided at any particular point in the network.

Block Command

A Block command can be applied against any facility or virtual facility in the network, where the facility may be a port of a device, and a virtual facility includes one or more communication channels provided at a port of a device. The Block can be applied against a working facility of virtual facility to prevent routing of new implicit connections over the facility indicated in the port identifier field. In addition, a Block may be issued against a protection facility, or channel, to prevent Extra Traffic from being routed over the facility. Typically, however, the Block command does not affect existing connections on the selected port, facility or virtual facility.

Once the block command is applied to the facility, the facility will not be use for establishing any further implicit connections, including restoration and protection connections. In one embodiment, an operator can "overwrite" this block command if required by using an explicit routing capability.

Figure 3:
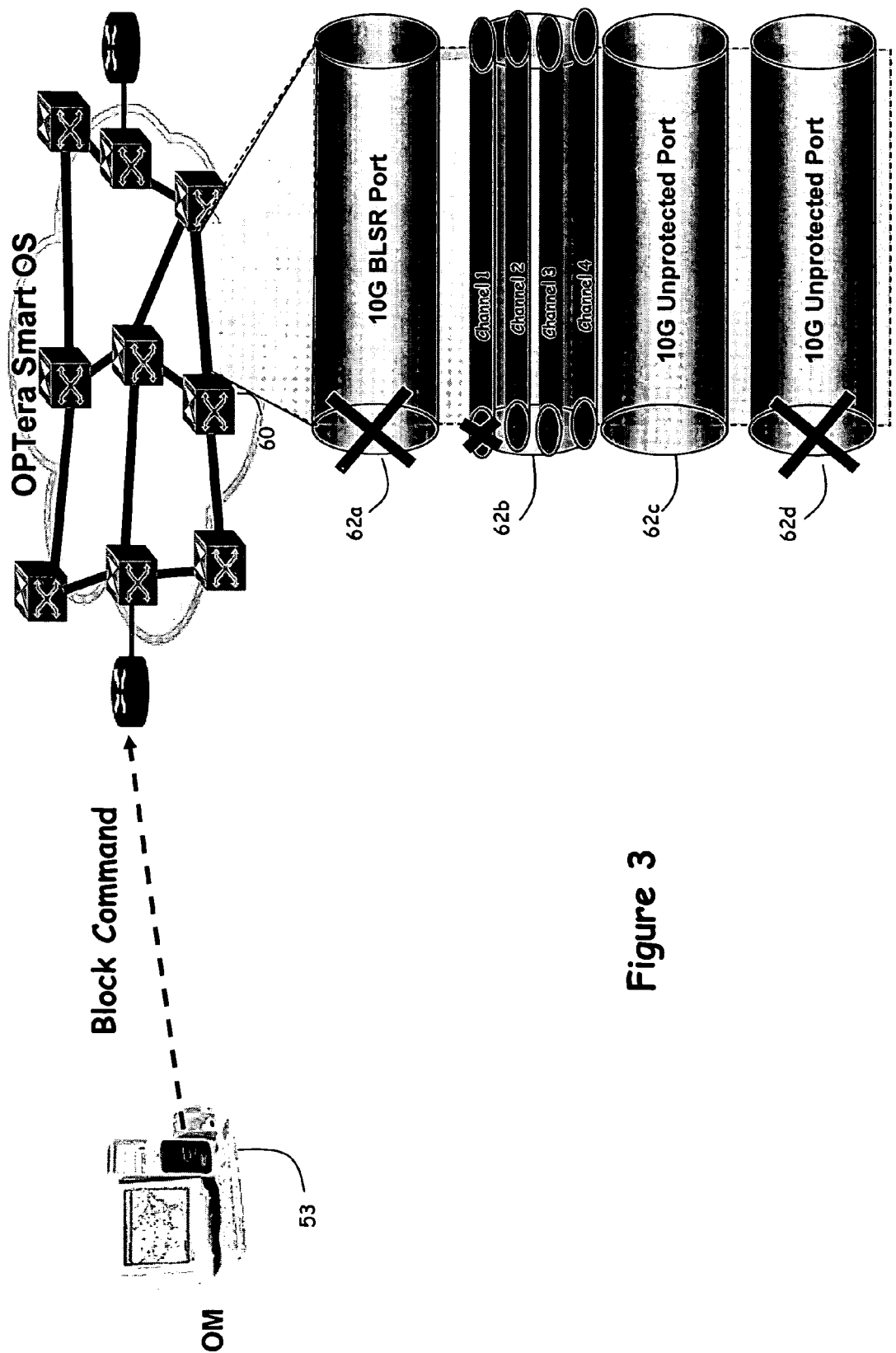
FIG. 3 is a diagram illustrating the use of a Block command of the present invention in the ASTN network of FIG. 2.

A Block Alarm is generated at each end of a facility when a block command has been applied. FIG. 3 illustrates the issuance of a block command at facilities/ports 62a and 62d of device 60. In addition, FIG. 3 illustrates the application of a block to channel 62b-1. The block command may be used in a variety of situations, such as to perform maintenance on specific channels of a link, or to simply prevent additional traffic from being assigned to an output port or channel for performance purposes.

Restoration States

Figure 5:
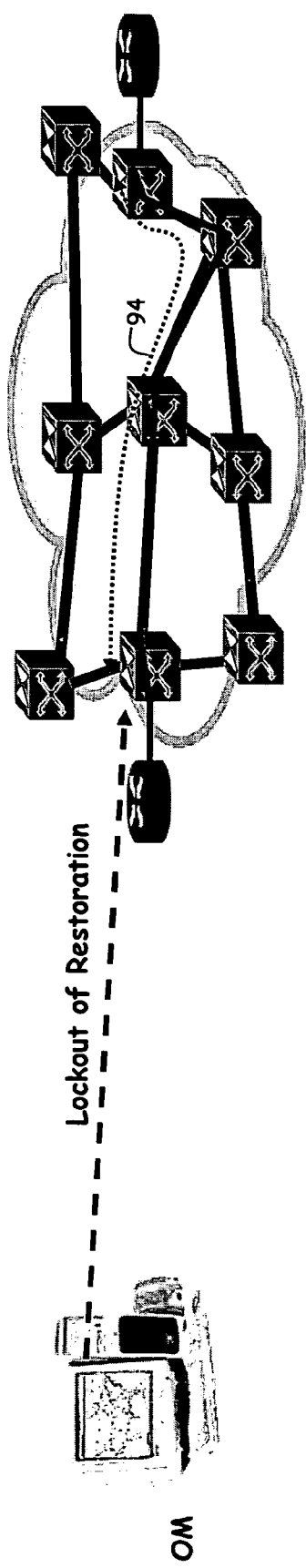
FIG. 5 is a diagram for illustrating the use of the Lockout of Restoration command in the ASTN network of FIG. 2.
Figure 6:
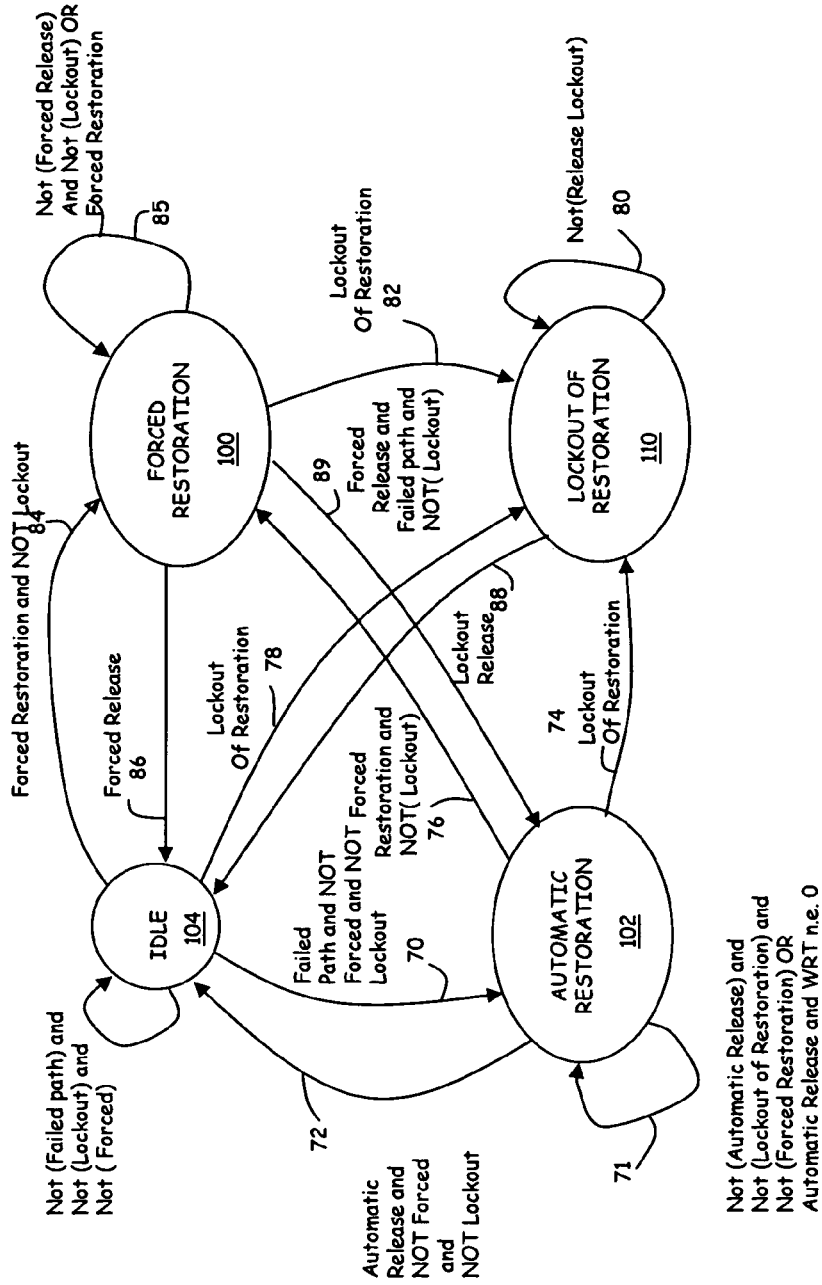
FIG. 6 is a state diagram for illustrating the transitions of call restoration states in response to user commands and network conditions.

The present invention includes several commands that can be used to set a restoration state of a call. The restoration states include IDLE, where no restorations are applied to the call, Automatic Restoration State, where the call is automatically routed to a restoration channel in the event of a failure of a portion of the working path for the call, Forced Restoration state, wherein a connection is intentionally switched to a restoration channel in order to perform maintenance on one or more links in the working path, and a Lockout of Restoration State, in which traffic is prevented from being transferred away from the working path. The states are prioritized, in the order, from highest priority to lowest priority, of Lockout of Restoration, Forced Restoration, Automatic Restoration and Idle. Thus, a connection that is in a Forced Restoration state will transition to a Lockout of Restoration state in response to a Lockout of Restoration command. Restoration states can be signaled at an Operation and Maintenance (OM) device or at other points in the network via call logs, events or alarms. More details about the effects of the commands and the interaction of the states will now be described with regard to FIGS. 4-6.

Automatic Restoration State

As mentioned above, when there is a fault in a portion of the working connection associated with a call, (i.e., a failed working path) the call needs to be transferred to a restoration path so that the working connection can be restored. Thus, upon receipt of the indication of failure of the path, a restoration path is identified, and traffic then transferred over the restoration path. The call remains in Automatic Restoration State until the working path is repaired, at which time an Automatic Release is generated, and traffic may be returned to the working path.

In some embodiments, a variable value Wait To Restoration (WTR) is used to define an amount of time that a call should remain in an Automatic Restoration state, after the working path is repaired. Traffic continues to be transferred on the restoration path until it is verified that the working path can remain working for the WRT time period. After the WRT time period expires, traffic is switched back to the working path. Using the WRT thus prevents undue switching between the working path and the restoration path arising out of repeated working path failures.

Forced Restoration State

The Forced restoration state is entered as a result of a user issuing a Forced Restoration Command upon a call. The Forced Restoration command can be applied against any call, and is used to force traffic away from a working connection of the call to a restoration connection for the call. The forced restoration command can therefore be used to re-direct traffic to enable maintenance of one or more links in the connection. The Forced Restoration thus provides functionality similar to Automatic Restoration, but is it user controlled. In order to be released from the Forced Restoration state, a user issues a Forced Release command for the call, causing the call to be routed back to its original working connection.

The ability of the user to transfer traffic to the restoration path using the Forced Restoration command permits traffic to be transferred without any performance degradation. As described above, typical prior art restoration schemes involve detecting that a failure has occurred in a path, and, once the failure is detected, identifying the restoration path and then switching traffic to the restoration path. During the time period between when the failure is detected, and when the restoration path is identified, no traffic can be forwarded between the endpoints, thereby degrading the performance of the system.

However, the present invention provides a mechanism for controlling transfer of calls to restoration paths without any traffic hit, because the user is able to generate the bridge (i.e., define the restoration path) while traffic is still being forwarded on the working path. Only after the restoration path has been established is the traffic switched over to the restoration path. Thus, the Forced Restoration command permits maintenance to be performed in a network with no loss of traffic.

Figure 4:
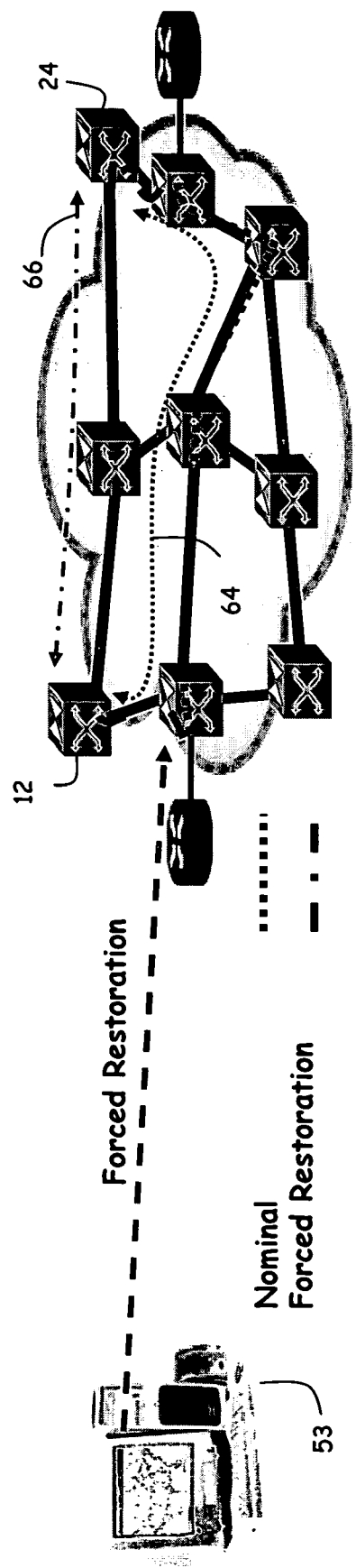
FIG. 4 is a diagram illustrating the use of a Forced Restoration command of the present invention in the ASTN network of FIG. 2.

For example, referring now to FIG. 4, to service any of the links in connection 66 between devices 12 and 24, a user at a network interface issues a Forced Restoration command, identifying the connection. The control plane then identifies a restoration path, such as restoration path 64, and then switches the call away from the connection 66 to connection 64.

Lock Out of Restoration State

The Lockout of Restoration state is entered in response to a user entered Lockout of Restoration command. In Lockout of Restoration state, transfer of traffic from the working path to a restoration of protection channel is inhibited. Thus, a user issues the Lockout of Restoration command when it is desired to prevent traffic from being routed away from the working channel to an alternate path. The Lockout of Restoration may be used for a variety of purposes, including performing maintenance on connections associated with calls that have been established, but for which there is no traffic traversing the connection. Rather than generate an additional connection for routing traffic that does not exist, the user can lockout any restoration on the path. When the connection is brought down for maintenance, because the call is in Lockout of Restoration state, a restoration path for the call will not be generated, and maintenance can be performed on the connection without the addition of routes to the network. A call remains in Lockout of Restoration state until a Release of Lockout command is issued by a user.

According to one embodiment of the invention, the Lockout of Restoration state is the highest priority restoration state for the call. Thus, if the call is in a lower priority restoration state (i.e. Forced Restoration State or Automatic Restoration State) then Control Plane initiates a switch back to working path, proceeds to restoration path deletion, and sets the call state to "Lockout of Restoration. For example, in FIG. 5, a user issues a Lockout of Restoration command on the call associated with connection 94. During the lockout, no restoration connections will be generated for this connection.

As mentioned above, the restoration states of a call have a priority of Lockout of Restoration State, Forced Restoration State, Automatic Restoration State and Idle Restoration state. A state diagram is provided in FIG. 6 for the purposes of illustrating the transitions of a call between the various restoration states in response to both network conditions and the issuance of commands at a user interface.

The call is in Idle state while it is being serviced over the working connection, and there is no Forced Restoration, Lockout of Restoration command by the user, and there is no failure of the working connection. The call transitions from Idle state to Automatic Restoration state on path 70 upon an indication of a failure of the working path. In addition, the call may also transition from Forced Restoration 100 to Automatic Restoration 102 as shown by line 89 in the event that the user issues a Forced Release command on the call, but there is still a Failed working path. In one embodiment, the call has a Class of Service bit set to indicate that Automatic Restoration should be applied to the call.

The call remains in Automatic Restoration State 102 until either the working connection is repaired, and the call is Released, or a user issues a Forced Restoration or a Lockout of Restoration command. If the call returns to Idle state on path 72 when the working connection is Released and no Forced Restoration command or Lockout of Restoration command is issued by the user. If the call is in Automatic Restoration state 102, and a Lockout of Restoration command is issued on the call, the call transitions on path 74 to Lockout of Restoration state 110. If the call is in Automatic Restoration state, and a Forced Restoration command is issued on the call, and no Lockout command is issued on the call, the call transitions to Forced Restoration state 100 on path 76.

Forced Restoration state 100 may also be entered via path 84 as a result of a user issued Force Restoration command, when there is no Lockout Restoration command issued on the call. As shown by line 85, the call stays in the Forced Restoration state 100 until either a user enters a Forced Release command on the call, or a user enters a Lockout of Restoration command on the call. In addition the call remains in Forced Restoration state 100 if a Forced Restoration command is received on the call when the call is already in Forced Restoration state (i.e., being forwarded on a restoration path). A Forced Restoration may be input against a call in this instance to switch the call to an alternate restoration path, for example to perform maintenance on the restoration path. When a user issues a Forced Release, and no Lockout of Restoration is issued, the call returns to IDLE state on path 86. Accordingly, the Forced Restoration and Forced Restoration Release commands can easily be used to set up an alternative restoration call connection to permit maintenance on a working connection. Only after the connection is identified is the traffic switched. With such an arrangement, there is no interruption to traffic flow for the call.

If the call is in Idle state, or Automatic Restoration state, or Forced Restoration state, and a user issues a Lockout of Restoration command, then the call is transitioned to Lockout of Restoration State 110 via paths 78, 74 and 82, respectively. In Lockout of Restoration state, no restoration connection can be used for the call. Thus, if the call was already being handled in a restoration channel, the Lockout command causes the call to be transferred back to the working channel. The call remains in Lockout of Restoration state until a user issues a Lockout Release command on the call. When the user enters a Lockout Release, the call state is transitioned to IDLE state on path 88. Once back in IDLE state, the call may be transitioned to Automatic Restoration state, if there is a fault in the working connection, or Forced Restoration for reasons previously described.

Figure 7:
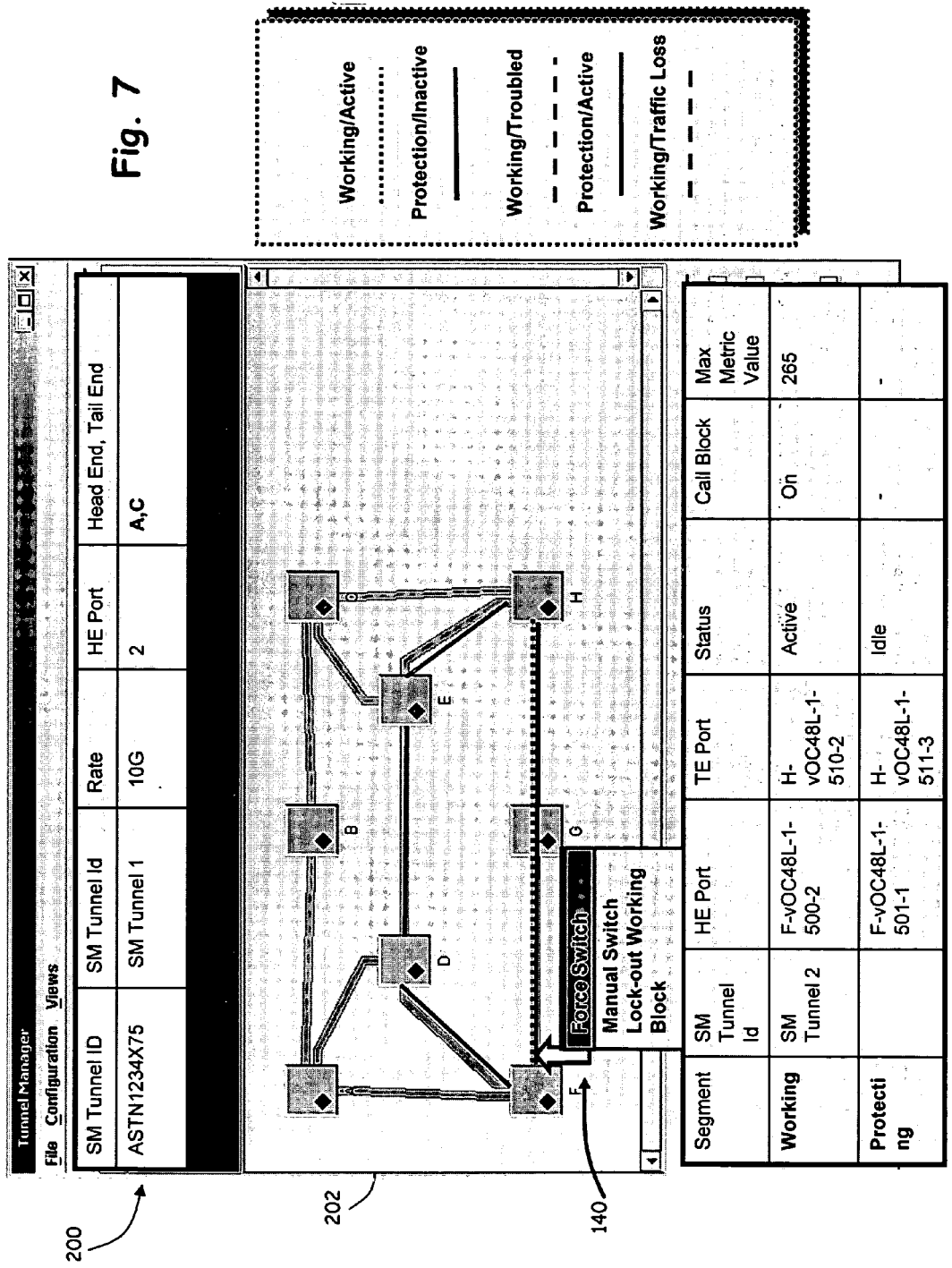
FIG. 7 is one embodiment of a graphical user interface (GUI) that may be used to invoke commands for modifying connections for maintenance purposes according to the present invention.

As mentioned previously, the commands may be entered in a variety of manners by the user, including at a graphical user interface. One exemplary graphical user interface that may be used to implement the present invention is provided in FIG. 7. In FIG. 7, the network is visually represented in the window 202, with the connections between endpoints being colored or otherwise highlighted (indicated herein by a dashed line). A pull down menu is provided when a connection is selected (by clicking with a mouse or other method) at a network management GUI 200. The pull-down menu includes a variety of commands that can be performed on the connection, including the Forced Switch (to Restoration), Manual Switch, Lock-out and Block commands. The user can select, from the pull down menu, the desired restoration behavior for the connection. While the GUI 200 of FIG. 7 provides a simple mechanism for defining restoration states for connections, the present invention is not limited to the use of any particular method of setting the state.

Figure 8:
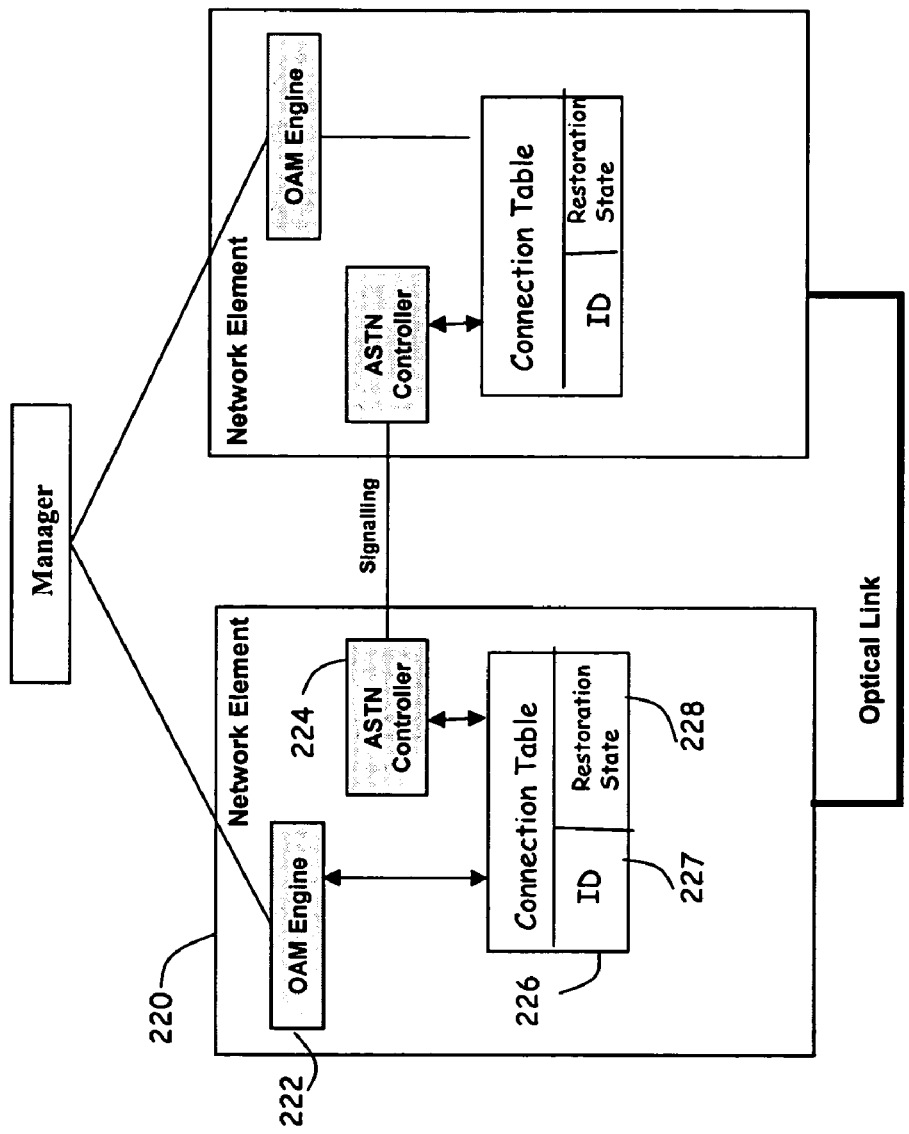
FIG. 8 is a block diagram illustrating various components that may be included in a network device for implementing the present invention.

Referring now to FIG. 8, exemplary components that may be included in a network device 220 supporting the present invention include an Operation and Maintenance engine 222, an ASTN controller 224 and a Connection Table 226. The connection table may be a data structure stored in a memory of the network device. Each entry of the connection table includes, for each call, a connection ID 227 and a Restoration attribute 228. The Restoration attribute 228 includes the state that is assigned to the connection. The ASTN controller accesses the connection table for storage of working and restoration paths.

Accordingly, a variety of user commands have been shown and described that enable a user to manipulate a call connection for the purpose of maintaining links in a network. The Block command prevents new traffic from being added to an output port of a device in a connection. The Forced Restoration/Release of Forced Restoration command set may be used to service the working channel. The Lockout of Restoration/Release of Lockout commands together provide an alternate method of servicing a working connection and preventing unnecessary generation of redundant connections in the network.

Various modifications to the above embodiments are envisioned, and therefore are not seen as limiting the present invention. In particular, although a mesh architecture has been shown and described it is understood that the above techniques can be used in any ASTN configuration, including rings and dynamic mesh configurations. Although various components were shown as functional blocks, it is understood that these functions may be implemented in hardware, software, or any combination thereof, and no particular delineation of functionality is part of the invention. Alternative embodiments of the invention may be implemented in any computer readable program language, whether it be conventional or object oriented, or alternatively using discrete components, integrated circuitry, programmable logic, microprocessors or any combination thereof. A computer program product implementation may include a series of computer instructions fixed either on a tangible medium, such as a computer readable media (e.g. diskette, CD-ROM, ROM or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g. microwave, infrared or other transmission techniques). The series of computer instructions embodies all or part of the functionality previously described herein with respect tot eh system. Those skilled in the art should appreciate that such computer instructions can be written in a number of programming languages for use with many computer architectures or operating systems. Furthermore, such instructions may be stored in a memory device, such as semiconductor, magnetic, optical or other memory devices, and may be transmitted using any communications technology, such as optical, infrared, microwave, or other transmissions technologies.

Having described various embodiments of the invention, it is understood that the present invention should not be limited to any specific disclosure herein, but rather is embodied in the spirit and scope of the claims attached hereto.

The invention claimed is:

1. A method for maintaining a network comprising the steps of:

issuing a command at a user interface coupled to the network, the command including an identifier associated with a working connection associated with at least one call between two devices in the network, the command for controlling selection of facilities for an alternate connection, the alternate connection to support the at least one call during maintenance of the connection, wherein communications traffic is forwarded over the working connection while the selection of facilities for the alternate connection is performed, wherein the network is an Automatically Switched Transport Network (ASTN), having a control plane, management plane and transport plane, wherein the commands for controlling selection are executed in the control plane of the ASTN, wherein the command is for forcing traffic on the working connection between the two devices to be routed to the alternate connection following the selection of the facilities for the alternate connection; and issuing a Lock out of Restoration command for forcing traffic back from the alternate connection to the working connection.

2. The method of claim 1, wherein the identifier identifies a facility at a device in the network, and wherein the command is for disabling selection of the facility for use in the alternate connection.

3. The method of claim 1, wherein the alternate connection is a restoration connection, and the command is a Forced Restoration command for forcing traffic from the working connection to the restoration connection to enable maintenance of the working connection.

4. The method of claim 1, wherein the working connection is a failing restoration connection, and wherein the alternate connection is a new restoration connection, and wherein the command is a Forced Restoration command for forcing traffic from the failing restoration connection to the new restoration connection.

5. The method of claim 1, wherein the identifier identifies a communication between two devices in the network provided over the working connection, and wherein the command is for inhibiting the generation of the alternate connection for the communication.

6. A method for maintaining a network comprising the steps of:

responsive to an input command from a user at a user interface, the command indicating a call between two devices that is routed over a working connection between the two devices, identifying an alternate connection for the call while forwarding traffic over the working connection, and then transferring traffic associated with the call over the alternate connection when the alternate connection has been identified, wherein the network is an Automatically Switched Transport Network (ASTN), having a control plane, management plane and transport plane, wherein the commands for identifying the alternate connection are executed in the control plane of the ASTN, wherein the input command is for forcing traffic on the working connection between the two devices to be routed to the alternate connection following the identification of the alternate connection; and issuing a Lock out of Restoration command for forcing traffic back from the alternate connection to the working connection.

7. The method of claim 6, wherein the alternate connection is a restoration connection and the command is a Forced Restoration command.

8. The method of claim 6, wherein the working connection is a failing restoration connection, the alternate connection is a new restoration connection and the command is a Forced Restoration command.

* * * * *